April 8, 1958 R. PLATH 2,829,849
PARACHUTE HARNESS
Filed Sept. 19, 1955 2 Sheets-Sheet 1
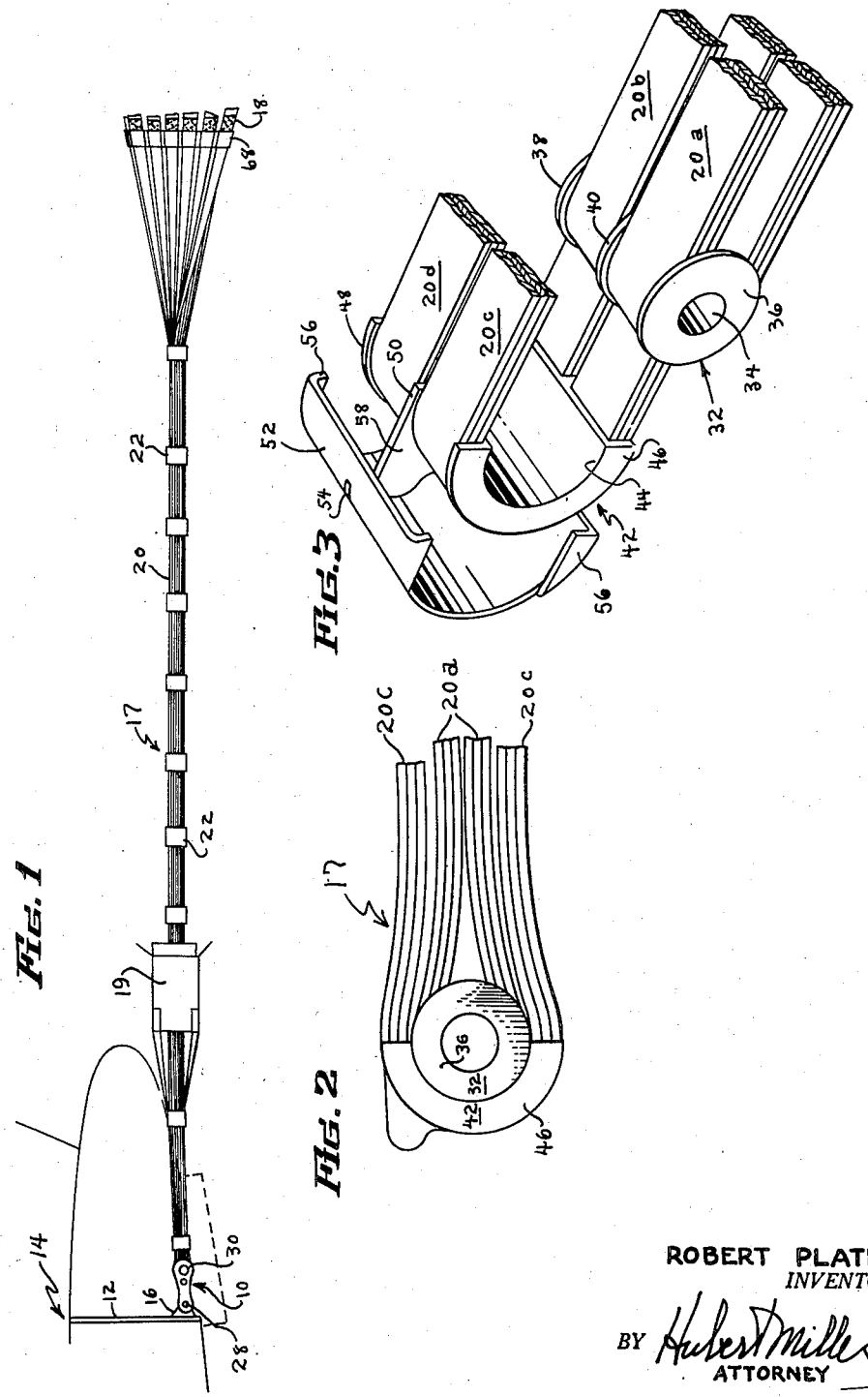
ROBERT PLATH
*INVENTOR.*
BY *Hubert Miller*
ATTORNEY April 8, 1958 R. PLATH 2,829,849
PARACHUTE HARNESS
Filed Sept. 19, 1955 2 Sheets-Sheet 2
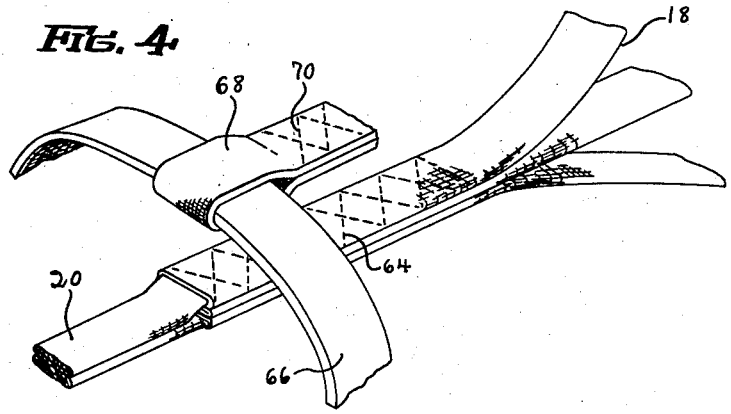
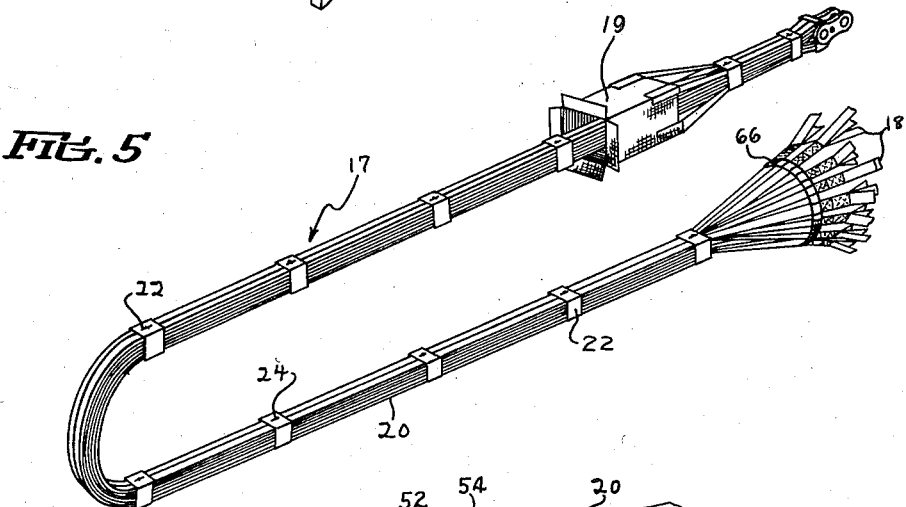
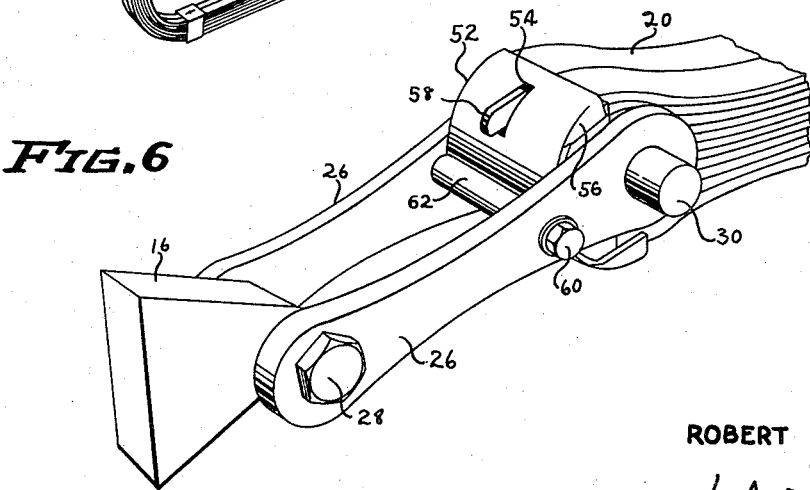
ROBERT PLATH
*INVENTOR.*
BY Hubert Miller
ATTORNEY United States Patent Office 2,829,849
Patented Apr. 8, 1958

2,829,849

PARACHUTE HARNESS

Robert Plath, Seattle, Wash., assignor to Boeing Airplane Company, Seattle, Wash., a corporation of Delaware Application September 19, 1955, Serial No. 535,055

14 Claims. (Cl. 244—113)

This invention relates to a parachute harness and pertains more particularly to a harness especially suited for plane deceleration chutes.

With the advent of high speed aircraft, especially planes of the jet variety, the need for deceleration or air brake parachutes has risen abruptly. Quite obviously, the sudden thrust of the chute into the slip-stream imposes large shock loads on the harness structure connecting the canopy to the aircraft. It is with reference to increasing the reliance or safety factor of the parachute harness with which the present invention is primarily concerned.

Accordingly, one important object of the invention is to increase the reliability of a parachute harness of the above character, affording complete assurance that the harness will withstand the hard usage expected of it.

In one aspect of the invention it is planned that the riser webs be seggregated into a plurality of distinct groups where they are looped to the coupling mechanism by which the chute is anchored to the plane, thereby minimizing the likelihood of the riser webs becoming dangerously scored or abraded in this vulnerable region.

Another object of the invention is to distribute in better fashion the shock load, the avoidance of highly concentrated loads in the above alluded to vulnerable region contributing to the realization of a strong and reliable chute assembly.

Another advantage to be derived from the practicing of the invention is the fact that neither the riser webs nor the suspension lines are spliced at critical points, the splicing being located only where the branching occurs.

A further object is the production of a parachute harness possessing an exceptionally high strength to weight ratio and also one that can be fabricated at a comparatively low cost.

Further, another object of the invention is to produce a parachute harness that may be used over and over again, by virtue of its unique and simplified construction the harness being capable of a prolonged life.

Still another object is a parachute construction permitting ready attachment and detachment of the riser webs to and from the coupling mechanism, wherever necessary, yet maintaining its connective relationship against inadvertent separation during both storage and deployment periods.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Figure 1 is a side elevational view of the parachute harness forming the subject of the instant invention, being pictured in a deployed condition;

Figure 2 is an elevational view of a portion of the harness illustrating one stage of assembly thereof;

Figure 3 is a perspective view depicting a more advanced stage of assembly, the parts being exlpoded to present a better understanding of how they are configured;

Figure 4 is a perspective detail picturing the manner in which the riser webs are connected to the suspension or shroud lines leading to the canopy;

Figure 5 is a perspective view resembling in substance Figure 1, but affording an opportunity to discern certain details of the harness construction not viewable in said earlier figure, and Figure 6 is a perspective view corresponding in part to Figure 1, but here again showing details that would not be fully understood by resorting only to the first figure.

Referring now more particularly to the drawings and especially to Figures 1 and 5 for the moment, the harness with which the invention is primarily concerned includes a coupling 10 by which the parachute is attached to a bulkhead 12 forming in the pictured situation part of the tail assembly 14 of a plane. Since in installations of this type the mechanism for deploying the chute and later jettisoning it can be quite elaborate and since this mechanism is only ancillary to the invention presently to be explained, it will be appreciated that the showing of a bracket 16, fixedly mounted to the bulkhead 12 and pivotally connected to the coupling 10, will suffice, presenting a simple mode of securement, schematic in nature.

Also included as part of the parachute harness is a drag line labeled 17 connected at one end to the coupling 10 and at its other end to a plurality of shroud or suspension lines 18 leading to the parachute canopy (not shown) by reason of which the desired braking action is to be achieved when the chute is thrust into the aircraft's slip-stream. A deployment bag 19 is associated with the drag line as can be seen in these two figures (Figures 1 and 5). As better viewed in Figures 2 and 3, the drag line 17 is comprised of a number of parallel riser webs or straps 20, held in a unitary fashion by a series of keeper bands 22 distributed along the length of the drag line and anchored fast as by means of suitable stitching 24.

The coupling 10 is composed of a pair of side arms 26, a transverse pin 28 connecting the arms to the bracket 16, as mentioned above. At the other end of the arms 26 is a second pin 30 extending through a spool-like thimble 32 equipped with a tubular body 34, circular end flanges 36, 38 and an intermediate flange 40, these flanges having a spacing sufficient to accommodate the riser webs 20 therebetween.

Circumjacent a portion of the thimble 32 is a larger half-thimble 42 provided with an arcuate body 44, a pair of semi-circular flanges 46, 48 at each end and an intermediate flange 50. So that the thimble 32 can be nestled or cradled by the half-thimble 42 the radius of curvature of the peripheral edges of the flanges 36, 38 approximates that of the inner surface of the half-thimble. Like the flanges 36, 38 and 40 the flanges 46, 48 and 50 are spaced so as to receive some of the riser webs therebetween. These four groups of riser webs 20 have been distinguished from each other by the addition of the suffix "a," "b," "c" and "d" to the parent numeral.

By segregating the riser webs into the four groups designated 20a, 20b, 20c and 20d, it can be appreciated that the likelihood of total severance attributable to the ravages of scoring and attrition is quite remote. In this connection, it perhaps should be specifically mentioned at this time that the peripheral edges of the flanges 36, 38 and 40 are of such radius that the web groups 20a and 20b can be freely accommodated without subjection to compressive forces between the concentrically arranged portions 34 and 44. In addition to the foregoing, the reliance or safety factor is further increased owing to the distribution or dispersal of the shock load transmitted to the coupling 10 from the canopy via the drag line 17, for in the exemplified instance the area provided by the thimbles 32 and 42 is quadrupled over that which would exist if the riser webs 20 were piled one on top of the other without segregation.

To militate against the entrance of abrasive particles and to lessen in general any deterioration, it is within the purview of the invention to incorporate into the coupling 10 a guard element 52 in the form of an arcuate shield having a circumferential slot 54 and inturned ears 56 at each corner. Integrally carried by the flange 50 is a radially projecting tongue 58 capable of mating with the slot 54, the coaction of the slot 54 and the ears 56 affording insurance against axial dislodgement of the guard. However, in order to lock the guard element 52 against radial displacement a pin 60 and bushing 62 circumposed thereabout are employed, the pin 60 extending through the arms 26 at a location that will bring the bushing 62 into juxtaposition with the outer surface of said guard.

While it is of course important to prevent axial shifting of the guard element 52, it is even more so with respect to the two thimbles 32 and 42. The arms 26, however, perform a dual function, inasmuch as they confront the ends of these thimbles, serving in this instance as washers of sufficient dimensions to overlap the two thimbles.

Up to this point, the riser webs 20 have not been specifically described as far as their specific construction is concerned. Attention is therefore directed to Figure 4 where two riser end portions are pictured and from this figure it can be seen that the riser webs 20 are each tubular, being of nylon. Also, in Figure 4 it will be noted that the suspension lines 18 are likewise of tubular nylon, the two riser webs 20 being telescopically received within two of the suspension lines 18. Interleaved between the adjacent suspension lines is a third suspension line, and by virtue of stitching 64 passing through the stacked assembly of riser and suspension line ends, a sturdy connection results. It is to be expressly noted that this stitching 64 is remote from the coupling end of the drag line 17, further enhancing the reliability of the harness, particularly where the harness is employed on a jet plane and is subjected to a jet wake temperature that decreases in relation to distance from the engine's tail cone, thereby disposing the spliced portions for the greater amount of time in a cooler zone.

Figure 4 further shows the use of a retaining band 66 having a strap section 68 looped thereabout, stitching 70 retaining the looped formation. As can be seen from Figures 1 and 5 the straps 68 are respectively secured to the assembled groups of suspension or shroud lines 18 by means of the stitching 70.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. In a parachute harness, concavo-convex first means for accommodating the looped ends of a first group of strap elements, second means having a convex outer surface partially nested in the concave portion of said first means for accommodating the looped ends of a second group of strap elements, and means maintaining said first and second means with their respective concave and convex surfaces in a spaced relation with respect to each other.

2. In a parachute harness, a first spool-shaped member provided with a cylindrical body and spaced circular flanges, a second spool-shaped member provided with a parti-cylindrical body having an inner radius of curvature approximating that of said circular flanges, and spaced flanges commensurate in perimetral length with that of said parti-cylindrical body, a first group of riser webs reversely looped about said cylindrical body, and a second group of riser webs similarly looped about said parti-cylindrical body.

3. The structure described in claim 2 in which said circular flanges bear against the inner surface of said parti-cylindrical body.

4. In a parachute harness, a pair of concentrically disposed riser and fitting attachments, said fitting attachments being substantially E-shaped when viewed in longitudinal section, and four respective groupings of riser webs accommodated by said fitting attachments.

5. The structure described in claim 4 in which each of said fitting attachments includes a trio of axially spaced flanges with the perimetral edges of the flanges on the inner attachment bearing against the inner side of the outer attachment.

6. In a parachute harness, a first thimble member provided with a cylindrical body, a circular flange at each end and a circular intermediate flange, at least one riser web having a reversely looped end disposed between each of said end flanges and the intermediate one, a second thimble member provided with a semi-circular body, a semi-circular flange at each end and semi-circular intermediate flange, the flanges of said first thimble member bearing against the inner side of the second one to maintain said members in a concentrically spaced relationship, and at least one riser web having a reversely looped end disposed between each of said second end flanges and the second intermediate one.

7. The structure described in claim 6 including a substantially semi-circular guard member, said second flanges bearing against the inner side of said guard member.

8. The structure described in claim 7 in which the second intermediate flange is equipped with a radially projecting tongue and said guard member has a mating slot through which said tongue extends.

9. In a parachute harness, a first thimble member provided with a cylindrical body, a circular flange at each end and a circular intermediate flange, at least one riser web having a reversely looped end disposed between each of said end flanges and the intermediate one, a second thimble member provided with a semi-circular body, a semi-circular flange at each end and semi-circular intermediate flange, the flanges of said first thimble member bearing against the inner side of the second one to maintain said members in a concentrically spaced relationship, and said thimble members being of substantially the same length, a pin extending through the bore of the first member and side arms connected to each end of said pin, said side arms restraining said thimble members against axial displacement.

10. The structure described in claim 9 in which the intermediate flange on the second thimble member projects through a guard element and there is a pin extending through said arms which is juxtaposed so as to prevent detachment of said guard element in a radial direction.

11. The structure described in claim 9 in which the free ends of the riser webs are connected to the free ends of the shroud lines leading to the canopy of a parachute at a general locus remote from said thimble members.

12. The structure described in claim 11 in which both the riser webs and the shroud lines are of nylon tubing, certain of said webs and lines being telescopically received one within the other at said locus connection.

13. In a parachute harness: first means of concavo-convex configuration, the convex outer surface of which is adapted to seat the looped ends of a first group of strapped elements; second means having an outer convex surface for seating the looped ends of a second group of strapped elements, the convex surface of said second means having a smaller radius of curvature than the concave surface of said first means; and means maintaining the convex surface of the second means in spaced partially nested, substantially concentric relationship with respect to the concave surface of said first means.

14. In a parachute harness, a first thimble member provided with a tubular body and annular end flanges for accommodating the looped ends of a first group of strap elements; a second thimble member provided with a concavo-convex body having end flanges for accommodating the looped ends of a second group of strap elements, the tubular body of the first member being partially nested within the concave portion of the second member; and means for maintaining the two members in such relationship.

References Cited in the file of this patent

UNITED STATES PATENTS

| | | |
|---|---|---|
| 1,359,571 | Bourguignon | Nov. 23, 1920 |
| 2,594,018 | Hillesheim | Apr. 22, 1952 |

FOREIGN PATENTS

| | | |
|---|---|---|
| 8,594 | Great Britain | 1914 |